United States Patent
Greenberg (10) Patent No.: US 7,864,751 B2
(45) Date of Patent: Jan. 4, 2011

(54) TRAFFIC ENGINEERING METHOD, SYSTEM AND COMPUTER PROGRAM PRODUCT FOR MANAGING TRAFFIC OVER DYNAMIC NETWORKS DURING BOTH NORMAL AND UNEXPECTED TRAFFIC SCENARIOS

(76) Inventor: Albert G. Greenberg, 1428 E. Ward St., Seattle, WA (US) 98112

( * ) Notice: Subject to any disclaimer, the term of this patent is extended or adjusted under 35 U.S.C. 154(b) by 158 days.

(21) Appl. No.: 12/228,622

(22) Filed: Aug. 14, 2008

(65) Prior Publication Data
US 2009/0059793 A1 Mar. 5, 2009

Related U.S. Application Data

(60) Provisional application No. 60/964,620, filed on Aug. 14, 2007.

(51) Int. Cl.
*H04L 12/28* (2006.01)
*H04J 3/16* (2006.01)
(52) U.S. Cl. ...................... 370/351; 370/468
(58) Field of Classification Search ............... 370/351, 370/395.389, 352, 395.21, 395.4, 468, 400, 370/419, 229, 252, 254; 455/13.1, 13.4, 455/33.1, 62, 67
See application file for complete search history.

(56) References Cited

U.S. PATENT DOCUMENTS

| | | | | |
|---|---|---|---|---|
| 5,590,395 | A | * 12/1996 | Diekelman | ................. 455/13.1 |
| 2003/0099194 | A1* | 5/2003 | Lee et al. | .................... 370/229 |
| 2005/0238000 | A1* | 10/2005 | Pollock et al. | .............. 370/352 |
| 2008/0239991 | A1* | 10/2008 | Applegate et al. | ........... 370/254 |

\* cited by examiner

*Primary Examiner*—Hanh Nguyen (57) ABSTRACT

A network traffic engineering method, system and computer program cope with dynamic and unpredictable changes in traffic demands and in the availability and quality of interdomain routes by monitoring traffic over a network having nodes and links, calculating a routing utilizing a convex-hull-based optimal traffic engineering algorithm with penalty envelope (COPE), and adjusting network traffic flow in accordance with the calculated routing. Aggregating collected historical traffic matrices to produce a predicted traffic matrix, the method optimizes for the expected traffic scenario while providing a worst-case guarantee for unexpected traffic scenarios and thereby advantageously achieves efficient resource utilization during normal traffic and avoids network congestion in a wide variety of scenarios.

38 Claims, 6 Drawing Sheets

TRAFFIC ENGINEERING METHOD, SYSTEM AND COMPUTER PROGRAM PRODUCT FOR MANAGING TRAFFIC OVER DYNAMIC NETWORKS DURING BOTH NORMAL AND UNEXPECTED TRAFFIC SCENARIOS

CROSS REFERENCE TO RELATED APPLICATIONS

This application is related to and is entitled to the filing date of Provisional Application Ser. No. 60/964,620, filed Aug. 14, 2007.

FIELD OF THE INVENTION

The present invention generally relates to traffic engineering in dynamic data communications networks, such as Autonomous Systems (ASes) used by Internet Service Providers (ISPs) to carry Internet traffic, and more particularly to providing optimized traffic routing through such networks.

BACKGROUND OF THE INVENTION

Traffic Engineering (TE) is concerned with performance optimization of operational networks. In general, it encompasses the application of technology and scientific principles to the measurement, modeling, characterization, and control of Internet traffic, and the application of such knowledge and techniques to achieve specific performance objectives.

A major goal of Internet Traffic Engineering is to facilitate efficient and reliable network operations while simultaneously optimizing network resource utilization and traffic performance. Traffic Engineering has become an indispensable function in many large Autonomous Systems because of the high cost of network assets and the commercial and competitive nature of Internet ISPs. These factors emphasize the need for maximal operational efficiency. Inefficient resource utilization and congestion result when traffic streams are inefficiently mapped onto available resources, causing subsets of network resources to become overutilized while others remain underutilized. In general, congestion resulting from inefficient resource allocation can be reduced by adopting load balancing strategies. The objective of such strategies typically is to minimize maximum congestion or alternatively to minimize maximum resource utilization, through efficient resource allocation. When congestion is minimized through efficient resource allocation, packet loss decreases, transit delay decreases, and aggregate throughput increases. As a result, the perception of network service quality experienced by end users becomes significantly enhanced.

Traffic demand characteristics are a major factor affecting the design of traffic engineering algorithms, i.e., methods used to control the flow of traffic in a network. Unfortunately, for many ASes, although traffic demand can be relatively stable most of the time, there exist time periods during which traffic can be highly dynamic, containing unpredictable traffic spikes that ramp up extremely quickly, leaving no time for a traffic engineering algorithm to re-compute or adjust. We recently examined the traffic traces of several backbone networks and found that short time periods exist during which traffic demand can increase by at least one order of magnitude.

Highly unpredictable traffic variations have also been observed and studied recently by other researchers. To further confirm the likelihood of observing highly unpredictable traffic spikes in real-life, we queried the operators of some large ASes and received reports of highly unpredictable traffic patterns in their daily operations. Many factors contribute to the highly unpredictable nature of Internet traffic: outbreaks of worms/viruses, outages or routing changes of major ISPs, the occurrence of natural disasters, denial-of-service attacks, and flash-crowd effects due to major news events. For many cases, traffic spikes occur exactly when the networking service should be at its most valuable. In addition, with sources of adaptive traffic such as overlay networks on the rise and more and more networks adopting traffic engineering, volatility and variability in traffic could increase further.

It is important that traffic engineering handle sudden traffic spikes. If a traffic engineering algorithm is not prepared for them, it may pay a serious performance penalty, possibly leading to router overload and even crashes. Such crashes reduce network reliability and may violate increasingly stringent service level agreements (SLAs), leading to potential financial penalties.

The importance of traffic engineering has motivated many studies in the last few years, and quite a few traffic engineering methods (algorithms) have been proposed. Many of these traffic engineering algorithms are described in our paper entitled "COPE: Traffic Engineering in Dynamic Networks," *SIGCOMM* '06, Sep. 11-15, 2006, Pisa, Italy, incorporated herein by reference (see e.g., sections 2 and 7) (hereinafter referred to as "COPE Paper"). Other examples of traffic engineering solutions have been proposed to deal with unexpected changes in traffic demands and/or interdomain routes.

Despite the importance of handling traffic spikes, most of the proposed traffic engineering algorithms belong to a type of algorithms which we call TE optimization based on samples. Such algorithms optimize their routing without preparing for unpredictable traffic spikes. In particular, in this type of algorithms, a set of sample traffic matrices is collected. A routing is then computed to optimize the performance for just these samples. The optimization can be conducted using either the average cost or the worst case over the samples. An advantage of this type of algorithms is their potential performance gain. When the network traffic is relatively stable, and the real traffic is similar to the samples based on which the routing is computed, these algorithms can achieve near-optimal performance. However, since these algorithms optimize routing specifically for these samples, when the real traffic deviates substantially from the samples (e.g., during the presence of traffic spikes), the routing may perform poorly.

An extreme case of TE optimization based on samples is completely-online adaptation, which essentially is a feedback loop using real-time traffic measurements to adjust routing. An advantage of this scheme is that it can converge quickly to optimal without the need to collect multiple samples. However, when there are significant fast traffic changes, routing recomputation delays can cause such methods to suffer a large transient penalty.

We have observed through the use of real traffic traces that TE optimization based just on samples can pay a serious performance penalty when unexpected traffic spikes occur, leading to potential network failure. For example, using the topology and real traffic traces of a major tier-1 ISP, we have found that optimizing routing based on historical traffic demand alone can result in a several-factor increase in traffic intensity compared to optimal routing (based on the actual demand). In such cases, the traffic intensity to some links well exceeds their link capacities. Additionally, for real Abilene Internet2 backbone traces, we observed that for some links, the traffic intensity generated by the algorithms based on predicted traffic demands reaches 2.44 times link capacity, while for an optimal routing, no link receives traffic above 50% of its capacity. Such large performance penalties arise when traffic demands change significantly from previous demands.

Another solution to providing a performance bound component for traffic engineering is provided by the pioneering work of oblivious routing, as described for example in D. Applegate and E. Cohen, "Making Intra-Domain Routing Robust To Changing And Uncertain Traffic Demands: Understanding Fundamental Tradeoffs," *Proceedings of ACM SIGCOMM '03*, Karlsruhe, Germany, August 2003 (hereinafter referred to as Applegate and Cohen).

In oblivious routing, a routing is computed that is independent of the historical traffic demand matrix, and thus has the potential to handle traffic spikes well. A potential drawback of completely oblivious routing, however, is its sub-optimal performance for normal traffic, which may account for the vast majority of the time the network operates. For example, the worst-case bound of the oblivious ratio (i.e., the ratio between the maximum link utilization under oblivious routing and that under optimal routing) is on the order of log(n), where n is the network size. Applegate and Cohen computed the oblivious ratio of several realistic network topologies. Although they discovered that the ratio is typically only around 2, they also commented that overhead at this level "is far from being negligible to working ISPs." The performance tradeoff required by oblivious routing means that in the average case, i.e., the case of expected traffic demands, oblivious routing is 30%-90% worse than optimal, which results in an inefficient and uneconomical use of network resources during the presumed majority of times the network is operating at average traffic levels.

The challenges to routing posed by such intradomain traffic demand fluctuations are compounded when the AS handles interdomain traffic through connections to other ASes. First, although interdomain routes for most traffic volumes can be stable, there are Border Gateway Protocol (BGP) routing changes which can cause significant shifts of traffic. In particular, with the dynamic nature of the global Internet, the available interdomain routes of an AS can fluctuate as its peers announce and withdraw interdomain routes, or even reset their eBGP sessions. Also, the quality of interdomain routes can fluctuate as network conditions fluctuate. If a currently used interdomain route is no longer available, or the quality of an interdomain route violates its Service Level Agreement (SLA), an AS has no choice but to adjust its routing. Second, interdomain routing introduces multiple-point demands; that is, there can be multiple equally-good egress points in the BGP decision process. Thus, it is up to the intradomain routing determined by traffic engineering to break the tie. Since egress links may become the bottlenecks of the network, this tie-breaking can affect the congestion of the network.

A major challenge in traffic engineering thus is how to cope with dynamic and unpredictable changes in intradomain traffic demands (as well as unpredictable changes in the availability and quality of interdomain routes), and simultaneously provide efficient and economical utilization of network resources during expected traffic demand scenarios.

Accordingly, there is a need to provide practically implementable traffic engineering methods and systems and computer program media that provide near optimal use of network topologies for expected traffic scenarios while simultaneously managing unexpected scenarios.

BRIEF SUMMARY OF THE INVENTION

Briefly, the present invention provides an improved method, system and computer program for routing traffic from an origin to a destination node over a network comprising routers at nodes and links connecting the nodes. The improved method, system and program provide optimized use of network topologies for expected traffic demands while providing a worst case guarantee for unexpected traffic demands.

Our key insight is that such methods and systems can be achieved with an efficient and easily implementable technique to guarantee worst-case performance under all traffic demands. We also have found that by choosing a worst-case ratio guarantee that is just slightly (e.g., a few percentage points) above the lowest possible ratio guarantee (the oblivious ratio), we can optimize routing for predicted traffic demands, and significantly improve average case performance. The technique is practical and feasible to implement because we have developed optimization algorithms that can be processed using known linear programming solutions (e.g., CPLEX® software) to achieve optimized routing (e.g., link-based routing) that can be applied in traffic management systems (e.g., Multi Protocol Label Switching (MPLS) systems) that are frequently encountered in networks. It has widespread network application because MPLS link-based routing solutions can be converted to a variety of other systems such as MPLS path-based routing systems, to shortest-path implementable routing systems, and to OSPF equal weight-split routing systems.

In one aspect, the present invention provides a method, system and computer program medium for routing traffic over an intradomain network.

In another aspect, the present invention provides a method and system for routing intradomain traffic in a network with dynamic interdomain connections.

The present invention provides a traffic engineering method that is economical in that it optimizes for the expected scenario yet is also robust in that it provides a worst-case guarantee for unexpected scenarios. Test results indicate close to optimal performance in the average case compared to the 30% to 90% falloff obtained with oblivious routing.

In the present invention, these network performance advantages are obtained by computing routings with a new class of traffic engineering algorithms (methods), called Convex-hull-based Optimization with Penalty Envelope (hereinafter designated by the acronym COPE). Our algorithms combine the best of prediction-based optimal routing and oblivious routing. Specifically, our algorithms optimize routing for predicted demands to achieve high efficiency under normal network conditions; in the meantime they also bound the worst-case performance penalty to ensure acceptable performance when the network experiences unpredictable changes.

In one aspect of the invention, a method for routing communications traffic in an intradomain network having routers at nodes and links carrying traffic between nodes comprises monitoring traffic demands between origin and destination nodes for the intradomain network; constructing a set of predicted traffic demands for traffic on the network based on the monitored traffic demands; computing an optimized routing matrix for the intradomain network based both on the predicted traffic demands and on a penalty envelope by setting linear programming constraints to provide a routing for the set of predicted traffic demands which will optimize a selected network characteristic, setting linear programming constraints to provide a penalty envelope to limit the maximum of the selected network attribute for the routing, the penalty envelope maximum value being above the oblivious routing value, and solving linear programs with such constraints to produce an optimized routing subject to the penalty envelope; and then adjusting routing in the intradomain network to correspond to the optimized routing. By following this method, efficient network resource utilization is obtained for expected traffic demands while providing a worst-case performance guarantee for unexpected traffic demands.

In another aspect of the invention, a system for routing communications traffic in an intradomain network having routers at nodes and links carrying traffic between nodes comprises a network traffic monitoring system for measuring traffic demands on the network during selected time periods; a network traffic management configuration system for applying routing control information to the network to control the flow of traffic on the network links; and a traffic engineering control system for receiving the measured traffic demands from the monitoring system and for computing a set of routing control parameters to be forwarded to the management configuration system, the traffic engineering control system constructing a set of predicted traffic demands for traffic on the network based on the monitored traffic demands and computing an optimized routing matrix for the intradomain network based both on the predicted traffic demands and on a penalty envelope by setting linear programming constraints to provide a routing for the set of predicted traffic demands which will optimize a selected network characteristic, setting linear programming constraints to provide a penalty envelope to limit the maximum of the selected network characteristic for the routing, the penalty envelope maximum value being above the oblivious routing value, and solving linear programs with such constraints to produce an optimized routing subject to the penalty envelope In another aspect of the invention, a computer program product for causing a computer to establish routing for communications traffic in an intradomain network having routers at nodes and links carrying traffic between nodes comprises a computer usable medium having computer readable program code means embodied in said medium, said computer readable program code means comprising computer readable program code means for causing a computer to collect a plurality of sets of traffic demands between origin and destination nodes for the intradomain network; computer readable program code means for causing a computer to construct a set of predicted traffic demands for traffic on the network based on the collected sets of traffic demands; computer readable program code means for causing a computer to compute an optimized routing matrix for the intradomain network based both on the predicted traffic demands and on a penalty envelope by setting linear programming constraints to provide a routing for the set of predicted traffic demands which will optimize a selected network characteristic, setting linear programming constraints to provide a penalty envelope to limit the maximum of the selected network characteristic for the routing, the penalty envelope maximum value being above the oblivious routing value, and solving the linear programs to produce an optimized routing subject to the penalty envelope. Application of the optimized routing to the intradomain network permits efficient resource utilization to be obtained for expected traffic demands while providing a worst-case guarantee for unexpected traffic demands.

In other aspects of the invention, a method for selecting routing in an intradomain network having routers at nodes and links carrying traffic between nodes and having ingress and egress links connected through peering links to at least one other network comprises measuring origin-destination pair traffic demands in the intradomain network; computing splitting ratios across peering links for sending origin-destination pair traffic demands; using the computed splitting ratios, deriving ingress-egress (IE) traffic matrices for the intradomain network; computing an optimized routing matrix for the intradomain network based both on the derived IE traffic matrices and on a penalty envelope by setting linear programming constraints to optimize a selected network characteristic and to provide a penalty envelope to limit the maximum of the selected network attribute for the routing, the penalty envelope maximum value being above the oblivious routing value, and solving linear programs with such constraints to produce the optimized routing subject to the penalty envelope; and applying the computed intradomain routing to the intradomain network; whereby efficient network resource utilization is obtained for expected traffic demands while providing a worst-case performance guarantee for unexpected traffic demands.

These and other objects and aspects of the invention will be apparent from the following description.

DETAILED DESCRIPTION OF THE INVENTION

Performance optimization of operational networks is fundamentally a control problem. In the traffic engineering process model, the Traffic Engineer, or a suitable automaton (such as a computer system operating under program control), acts as the controller in an adaptive feedback control system. This system includes a set of interconnected network elements (nodes and links), a network performance monitoring system, and a set of network configuration management tools. The Traffic Engineer formulates a control policy, observes the state of the network through the monitoring system, characterizes the traffic, applies the control policy to obtain control actions and applies the control actions to drive the network to a desired state, in accordance with the control policy. Typically, control actions involve modification of traffic management parameters, e.g., modification of link parameters in link-based MPLS. This can be accomplished reactively by taking action in response to the current state of the network, or pro-actively by using forecasting techniques to anticipate future trends and applying action to manage predicted undesirable future states.

The present invention is a system, method, and computer program product that monitors network performance, processes traffic matrices to obtain predicted demands, and then derives, using optimization techniques, a network routing that, when applied to the network, optimizes for predicted demands to achieve high efficiency under normal network conditions and also bounds the worst-case performance penalty to ensure acceptable performance when the network experiences unpredictable changes.

Figure 1:
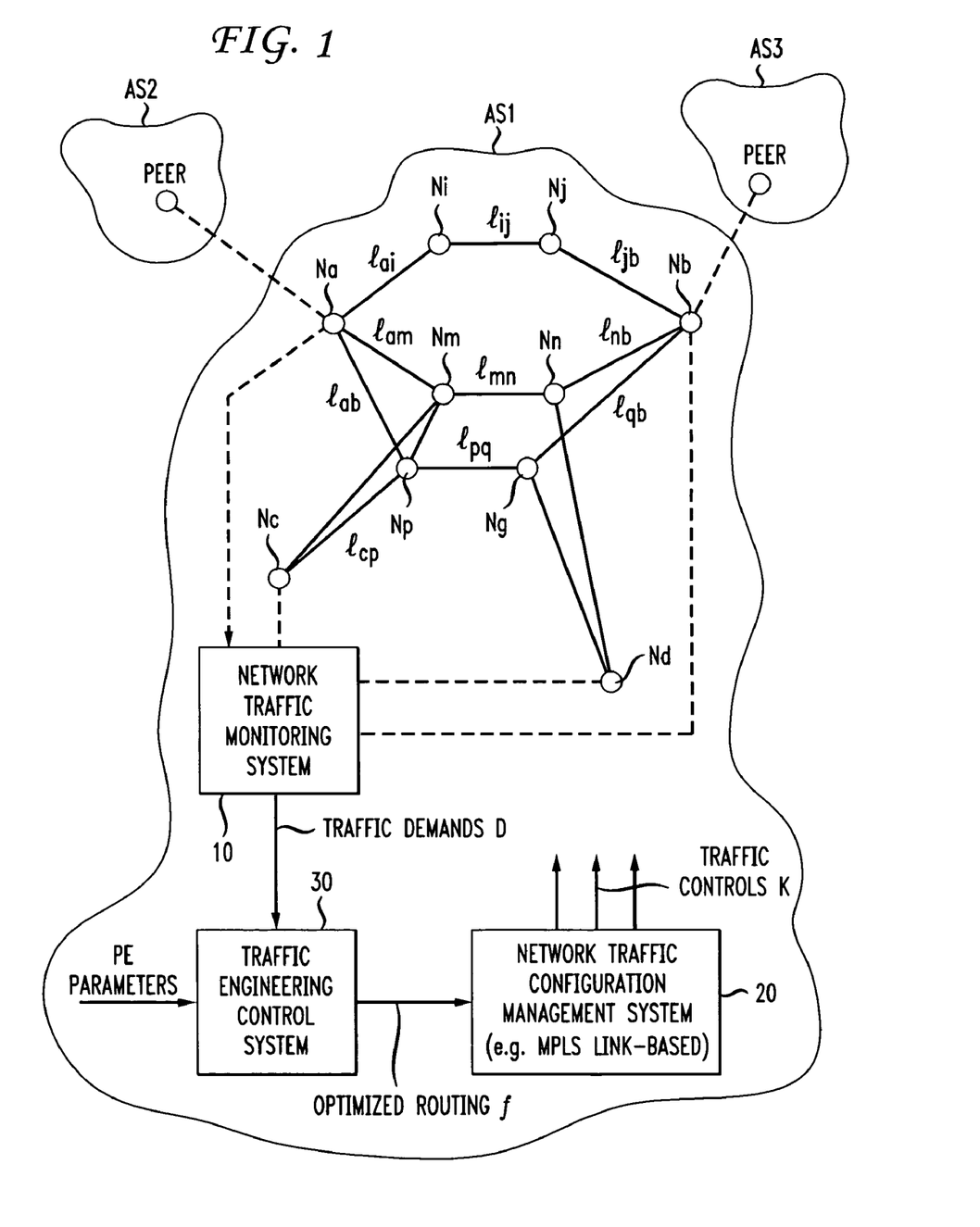
FIG. 1 is a schematic view of a network to which traffic engineering is applied.

FIG. 1 illustrates an Autonomous System AS1 according to the present invention. AS1 is, for example, a network used by an Internet Service Provider (ISP) to carry Internet traffic. Typically, AS1 has interdomain linkages, over peering links P2 and P3, to other ASes such as AS2 and AS3, which may be other ISPs or Internet backbone networks.

AS1 includes a network traffic monitoring system 10, of a type known in the art, which measures and collects a set of historical traffic demand matrices D that represent, for example, the traffic carried by the network AS1 at hourly or daily intervals. AS1 also includes a network traffic configuration management system 20, also of a type known in the art, which has as its input a set of routing parameters f capable of characterizing the routing of traffic over the network AS1 and has as its output a set of traffic controls K that will configure the network AS1 to route traffic in accordance with the routing parameters f. If AS1 is a MPLS link-based network, for example, the routing f and controls K will be link-based as well.

AS1 further includes a traffic engineering (TE) control system 30, which has as its input the traffic demand matrices D collected by the traffic monitoring system 10, and which has as its output routing parameters f that are optimized in accordance with the methods of the present invention. As is known in the art, TE control system 30 may be under the control of an individual Traffic Engineer, but preferably is automated, typically using known computer memory and processing elements operating under computer program control to process the traffic demand matrices D. TE control system 30, using a method to be described below, advantageously processes traffic demand matrices D to provide routing parameters f which optimize routing for predicted demands to achieve high efficiency under normal network conditions, and also bound the worst-case performance penalty to ensure acceptable performance when the network experiences unpredictable changes.

Figure 2:
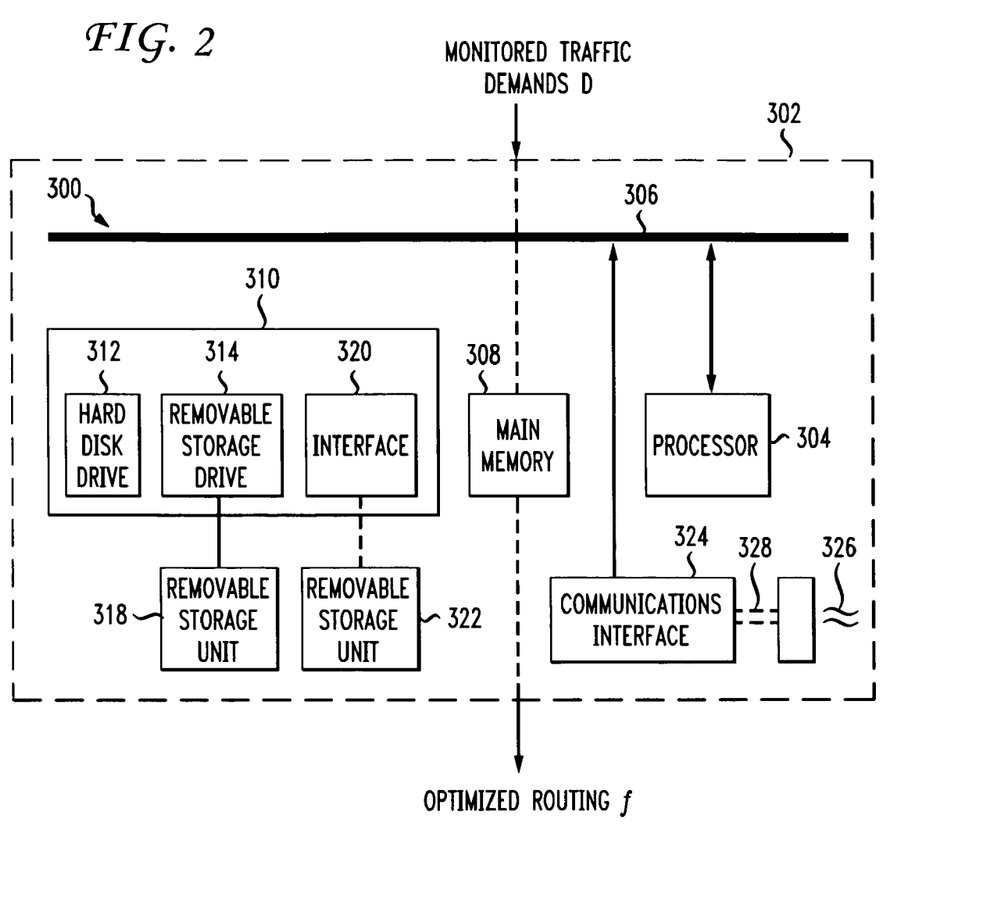
FIG. 2 is a schematic view of a traffic engineering control system of the present invention.

FIG. 2 depicts an example of processor and memory elements which may be used in TE control system 30. The functions of such processors may be implemented using hardware, software or a combination thereof and may be implemented in a computer system or other processing system. In one embodiment, the present invention is directed toward one or more computer systems capable of carrying out the methods of the invention; in another embodiment, the present invention is directed to computer program code storage medium to cause a computer to perform the methods of the invention. The example computer system 300 shown in FIG. 2 includes one or more processors, such as processor 304. The processor 304 is connected to a communication bus 306. Various software embodiments are described in terms of this example computer system. After reading this description, it will become apparent to a person skilled in the relevant art how to implement the invention using other computer systems and/or computer architectures.

Computer system 300 also includes a main memory 308, preferably random access memory (RAM), and can also include a secondary memory 310. The secondary memory 310 can include, for example, a hard disk drive 312 and/or a removable storage drive 314, representing a floppy disk drive, a magnetic tape drive, an optical disk drive, etc. The removable storage drive 314 reads from and/or writes to a removable storage unit 318 in a well known manner. Removable storage unit 318, represents a floppy disk, magnetic tape, optical disk, etc. which is read by and written to by removable storage drive 314. As will be appreciated, the removable storage unit 318 includes a computer usable storage medium having stored therein computer software and/or data.

In alternative embodiments, secondary memory 310 may include other similar means for allowing computer programs or other instructions to be loaded into computer system 300. Such means can include, for example, a removable storage unit 322 and an interface 320. Examples of such include a program cartridge and cartridge interface (such as that found in video game devices), a removable memory chip (such as an EPROM, or PROM) and associated socket, and other removable storage units 322 and interfaces 320 which allow software and data to be transferred from the removable storage unit 318 to computer system 300.

Computer system 300 can also include a communications interface 324. Communications interface 324 allows software and data to be transferred between computer system 300 and external devices, such as the network traffic monitoring system 10 and network management system 20 shown in FIG. 1. Examples of communications interface 324 can include a modem, a network interface (such as an Ethernet card), a communications port, a PCMCIA slot and card, etc. Software and data may be transferred to the computer system 300 via communications interface 324 in the form of electronic, electromagnetic, optical or other signals capable of being received by communications interface 324 and stored in memory 308 or storage 310 for execution by the computer processor 304. These signals 326 are provided to communications interface 324 via a channel 328. This channel 328 carries signals 326 and can be implemented using wire or cable, fiber optics, a phone line, a cellular phone link, an RF link and other communications channels.

In this specification, the terms "computer program medium" and "computer usable medium" are used to generally refer to media such as removable storage device 318, a hard disk installed in hard disk drive 312, and signals 326. These computer program products are means for providing software to computer system 300.

Computer programs (also called computer control logic) are stored in main memory 308 and/or secondary memory 310. Computer programs can also be received via communications interface 324. Such computer programs, when executed, enable the computer system 300 to perform the features of the present invention as discussed herein. In particular, the computer programs, when executed, enable the processor 304 to perform the features of the present invention. Accordingly, such computer programs represent controllers of the computer system 300.

In an embodiment where the invention is implemented using software, the software may be stored in a computer program product and loaded into computer system 300 using removable storage drive 314, hard drive 312 or communications interface 324. The control logic (software), when executed by the processor 304, causes the processor 304 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s). In yet another embodiment, the invention is implemented using a combination of both hardware and software.

Figure 3:
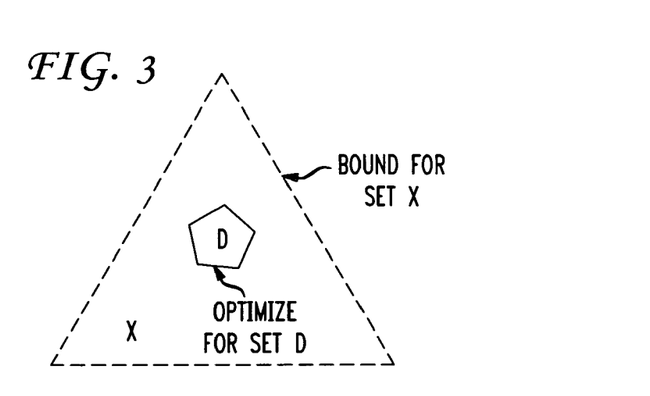
FIG. 3 is a diagrammatic view of the routing methodology of the present invention.

FIG. 3 is a diagram that graphically depicts the method followed by the present invention to obtain a routing f. As shown, the method includes two aspects: optimizing for a set D of predicted traffic demands, derived from the traffic demands D collected by monitoring system 10, and bounding possible routings f so they allow demands only within a larger set X which includes the set D but also includes other feasible but unpredictable demands. The boundary of set X is called a penalty envelope PE. A routing f which results from the application of the two aspects of this method is able to efficiently handle normal traffic, yet has a worst-case guarantee for unpredicted demands.

Figure 4:
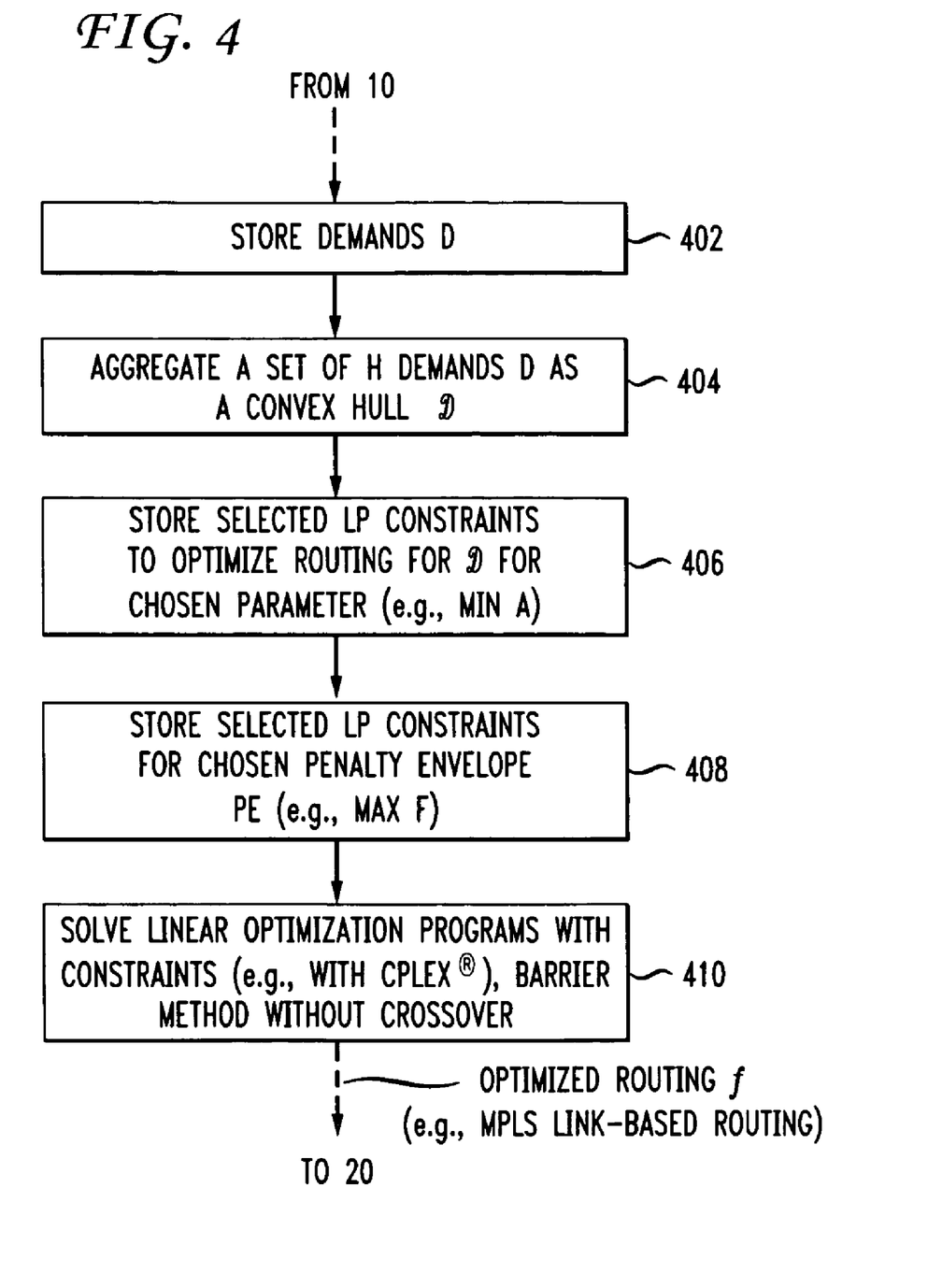
FIG. 4 is a flowchart illustrating a method for providing a network routing according to the invention.

FIG. 4 is a flowchart further depicting the steps in the optimization method as applied to the network in AS1. TE control system 30 receives traffic demand matrices D from monitor 10 on a periodic basis, e.g., once an hour or once a day. At step 402, a number H of the traffic demand matrices D are stored. At step 404, the set H of the stored matrices D is aggregated into a set D of predicted demands based on the historical demands D, e.g., by constructing a convex hull of the demands D. At step 406, linear programming constraints selected to optimize routing f on D for the chosen network characteristic, e.g., to minimize MLU (Maximum Link Utilization), to minimize network cost, or to minimize another network characteristic, are stored. Typically, the optimizing constraints will be input to computer system 300 in software form, and will have constants whose values are determined by the predicted demand set D. At step 408, linear programming constraints selected to establish a penalty envelope PE for the optimized network characteristic are stored. Typically, the penalty envelope constraints will be input to computer system 300 in software form, and will have constants whose values are determined by a selected penalty envelope value and the predicted demand set D. At step 410, linear optimization programs are processed using known linear programming techniques operating on the stored constraints selected at steps 406 and 408 and data values for predicted demand set D and the value of the penalty envelope PE, to provide a solution in the form of the routing f which optimizes the selected characteristic subject to the selected penalty envelope PE. Typically, the linear optimization programs will be input to computer system 300 in software form.

Figure 5:
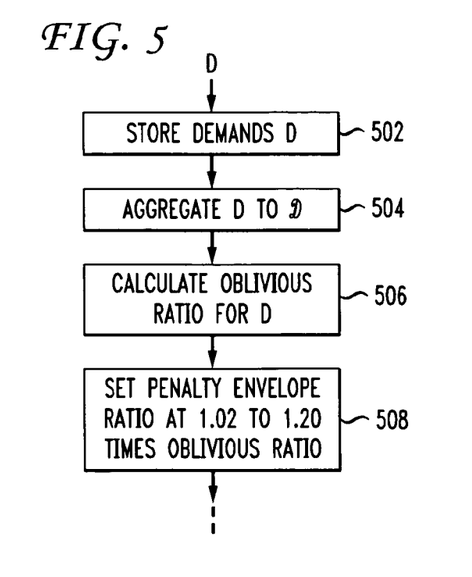
FIG. 5 is a flowchart illustrating a method for deriving a penalty envelope value in network routing according to the invention.
Figure 6:
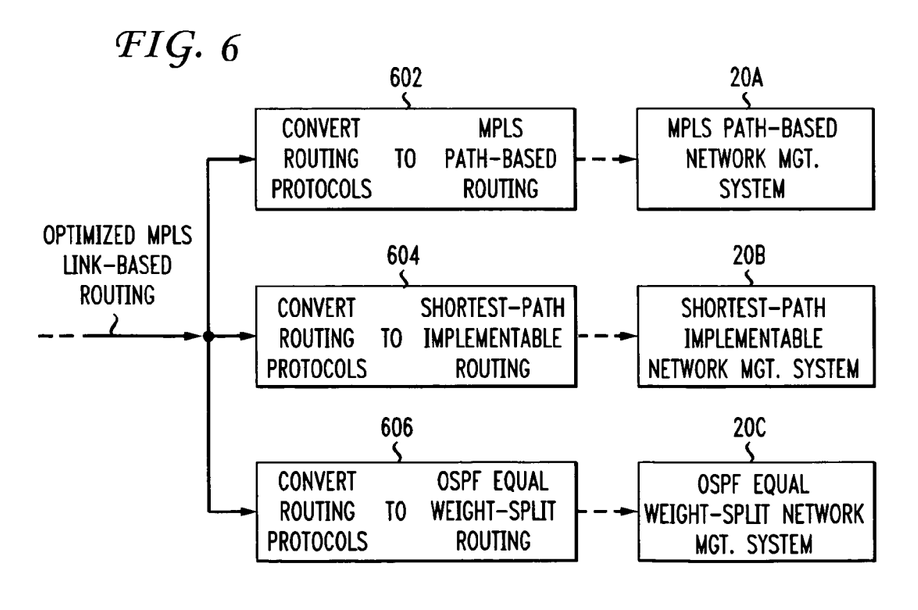
FIG. 6 is a flowchart illustrating a method for conversion of routing formats according to the invention.

FIG. 5 is a flowchart depicting a method according to the invention for selecting a value for penalty envelope PE. In step 502, traffic demands D are stored, and at step 504 the demands D are aggregated to form a set of predicted demands D. At step 506, the oblivious ratio for the set of predicted demands D is calculated. The oblivious ratio may be calculated for example, by using the techniques presented in the Applegate and Cohen paper. At step 508, the penalty envelope ratio is set at a value related to the oblivious ratio. The present inventors have found that setting the penalty envelope ratio a few percentage points above the oblivious ratio provides almost optimum routing performance during normal traffic, yet is able to substantially improve performance during unexpected traffic scenarios. Empirically derived test results indicate that having the penalty envelope ratio at 1.02 to 1.2 of the oblivious ratio provides good results, with the best results for normal traffic being obtained with a penalty envelope ratio at 1.02 to 1.08 of the oblivious ratio. Expressed as percentages, having the penalty envelope ratio at 2% to 20% above the oblivious ratio provides good results, with the best results for normal traffic being obtained with a penalty envelope ratio at 2% to 8% above the oblivious ratio The output of the method of FIG. 4 is a routing f fashioned to be in a format that is usable by the traffic configuration management system 20. In the example we describe in greater detail below, the routing f is in link-based MPLS routing. FIG. 6 is a flowchart depicting a method for applying such a routing to other formats. In FIG. 6, 20A designates a network configuration management system based on MPLS path-based routing, 20B designates a network configuration management system based on shortest-path implementable routing, and 20C designates a network configuration management system based on OSPF equal weight-split routing. At step 602 the link-based MPLS routing protocol is converted to a MPLS path-based routing protocol, which is fed to system 20A. At step 604 the link-based MPLS routing protocol is converted to a shortest-path implementable routing protocol, which is fed to system 20B. At step 606 the link-based MPLS routing protocol is converted to an OSPF equal weight-split routing protocol, which is fed to system 20C. Ordinarily a single network such as AS1 will have only one form of network management, and thus only one of the three conversions illustratively shown in FIG. 6 will be used.

The optimizing and penalty envelope LP constraints for predicted traffic set D which are stored in steps 406 and 408 of the method shown in FIG. 4 may be derived using analytical techniques. An example of the derivation of such constraints is given below.

Referring again to FIG. 1, AS1 has a network topology with routers positioned at intradomain nodes N, the routers N being connected to one or more other routers by communication links L. Packetized Internet traffic travels between Origin node Na and Destination node Nb (Na-Nb are said to be an Origin-Destination or O-D pair) and between O-D pair Nc and Nd over paths or routes which comprise routers at generalized nodes Ni, Nj joined by generalized links L(i,j). Thus as shown in FIG. 1 for illustrative purposes, traffic may travel between Na and Nb over three routes: (1) Na→L(a,i)→Ni →L(i,j)→Nj→(j,b)→Nb; (2) Na→L(a,m)→Nm→L(m,n)→Nn→L(n,b)→Nb; and (3) Na→L(a,p)→Np→L(p,z)→Nq→L(q,b)→Nb. Similarly, traffic may travel between Nc and Nd over two routes: (1) Nc→L(c,m→Nm→L(m,n)→Nn→L(n,d)→Nd; and (2) Nc→L(c,p)→Np→L(p,q)→Nq→L(q,d)→Nd. Network traffic monitoring system 10 is arranged to measure and record O-D traffic over each path.

FIG. 1 shows a limited network topology with few elements for ease of illustration. A practical AS used by an ISP, for example, will include a larger number of nodes and links.

To help explain the operation of TE control system 30, and the methods of its operation that allow it to be readily implemented using well known computational systems and methods, there follows a discussion of network topology and nomenclature, network characteristics to optimize, optimization over combinations of traffic demand matrices, and optimization with penalty envelope constraints.

Network Topology and Nomenclature

In general, the topology of an intradomain network AS1 is represented by a graph G=(V,E) where V is the set of all routers at nodes N in the network, and E is the set of all links L. The capacity of a link L(i,j) between nodes Ni and Nj is denoted as c(i,j).

As noted above, the input to traffic engineering control system 30 is a collection of traffic demand matrices (TM), represented as a set of demands D, where D={$d_{ab}$|a,b∈V}, where $d_{ab}$ is the demand for the O-D pair a→b.

[The notation in the brackets in previous expression means "the set of all $d_{ab}$ for which it is true that a,b belong to V".]

The output of TE control system 30 is the routing f. About half of the current ISPs run MPLS in their core and more ASes are starting to deploy MPLS, so to illustrate the present invention we use MPLS as an example of use. In addition, for exemplary purposes, we use link-based routing. Those of skill in the art will understand that the principles of the invention may be applied to other network forms of routing. Techniques are known, for example, for converting link-based routing to standard MPLS path-based routing, to shortest-path implementable routing, and to OSPF equal weight-split routing, as shown in FIG. 6. Thus, unless otherwise noted, routing refers to link-based routing in this example.

A link-based routing f is specified by a set of values:
f={$f_{ab}$(i,j)|a,b,i,j∈V}, where $f_{ab}$(i,j) specifies the fraction of demand from a to b that is routed over the link L(i,j).

In routing f, the values of $f_{ab}$(i,j) for the O-D pair a→b should specify a flow of value 1 from a to b (i.e., the sum of all the fractions is 1). For an actual demand $d_{ab}$ for the O-D pair a→b, the contribution of this demand to the flow on any link L(i,j) is $d_{ab}$ $f_{ab}$(i,j). The constraints on the routing variables {$f_{ab}$(i,j)} are flow conservation and non-negativity, which can be defined by the three following equations:

$$\forall a \neq b, \forall i \neq a,b: \Sigma_{(i,j) \in E} f_{ab}(i,j) - \Sigma_{(j,i) \in E} f_{ab}(j,i) = 0 \quad (1a)$$

$$\forall a \neq b: \Sigma_{(a,j) \in E} f_{ab}(a,j) - \Sigma_{(j,a) \in E} f_{ab}(j,a) = 1 \quad (1b)$$

$$\forall (i,j) \in E: f_{ab}(i,j) \geq 0 \quad (1c)$$

Network Characteristics to Optimize

The goal of traffic engineering is to provide an optimal routing, but there are different network characteristics that routing can optimize. Among them are Maximum Link Utilization (MLU) and cost. For illustration, we proceed to describe optimization related to MLU.

The MLU of a routing f on a TM D is defined as the maximum of traffic to capacity ratios among all links. (Note that this definition will allow utilization to be above 100%, while in practice, link utilization cannot exceed 100%. To be consistent with terminologies used by other authors, we use MLU with the understanding that it can exceed 100%.) Maximum link utilization then may be represented by the expression:

$$U(f,D) = \max_{(i,j) \in E} \Sigma d_{ab} f_{ab}(i,j)/c(i,j) \quad (2)$$

An optimal routing for a given TM D is a routing that minimizes the maximum link utilization. Formally, the optimal utilization for a TM D is given by:

$$OU(D) = \min_{f \text{ is a routing}} U(f,D) \quad (3)$$

The performance ratio of a given routing f on a given TM D is defined as:

$$P(f,D) = U(f,D)/OU(D) \quad (4)$$

The performance ratio P measures how far the routing f is from being optimal on TM D. P(f,D)=1 indicates that the routing f is optimal. A higher ratio indicates that the performance is farther away from the optimal.

Combinations of Traffic Demand Matrices

To account for fluctuation in network traffic, routing can be optimized for multiple traffic demand matrices. This improves robustness. Let D be a set of TMs D. The maximum performance ratio of a routing f on the set D is defined as $$P(f,D) = \max_{D \in \mathcal{D}} P(f,D) \quad (5)$$

We refer to a routing achieving the minimum of maximum performance ratio on D as an optimal min-max routing on D, and the corresponding maximum performance ratio as the optimal min-max ratio on D. When D is the complete traffic demand space, the optimal min-max routing is referred to as the oblivious routing, and the optimal min-max ratio is referred to as the oblivious ratio.

As mentioned above, the network traffic monitoring system 10 measures sets of traffic demand matrices (TMs) D. Assume that a traffic engineering control system 30 has stored a set of measured TMs {$D_1, \ldots, D_H$} where H is the number of TMs. To compute the routing for the next interval, the TE system needs to predict TMs that may appear during the next interval. There can be many predictors of the next value when prior values are known. A large class of predictors (e.g., exponential moving average) essentially estimates the TM of the next interval as a convex combination of the previously seen TMs. Aggregating the predictions of all such predictors (i.e., collecting all calculated predictions), we obtain the convex hull of {$D_1, \ldots, D_H$}.

Optimization Based on Predictions

Let D be the convex hull of the set of TMs {$D_1, \ldots, D_H$}. Then the problem of finding the optimal min-max ratio r of the network on the set of TMs D can be formulated as the following optimization problem:

min r,
subject to
f is a routing
∀link L, ∀TM D=$\Sigma t_h D_h, t_h \geq 0, \Sigma t_h = 1$ (summed over h=1 to H), $\Sigma d_{ab} f_{ab}(L)/c(L) \leq r \cdot OU(D)$.(summed over a,b)

Using the fact that the performance ratio P(f,D) is scale-free, i.e., P(f,D)=P(f,αD), for all scalar α>0, it can be shown that computing the optimal min-max routing over the convex hull is equivalent to computing the optimal min-max routing over a convex cone with the additional constraint OU(D)=1. (For a proof, see section 3.2 of our paper "COPE: Traffic Engineering in Dynamic Networks," *SIGCOMM* '06, Sep. 11-15, 2006, Pisa, Italy, attached to this specification and incorporated herein by reference.) The convex cone formulation presents a formulation that is more easily solved using linear programming software and techniques.

This leads to the linear programming (LP) formulation min r,
subject to
f is a routing
∀link L, ∀TM D=$\Sigma t_h D_h, t_h \geq 0$, OU(D)=1 (summed over h=I to H), $\Sigma d_{ab} f_{ab}(L)/c(L) \leq r$ (summed over a,b)

The last two lines of constrains above can be tested by solving, for each link L, the following "slave LP", and testing if the objective is ≤r or not:

max $\Sigma d_{ab} f_{ab}(L)/c(L)$
subject to
$g_{ab}$(e) is a flow of demand $d_{ab}$,
∀link M, $\Sigma g_{ab}(M) \leq c(M)$ (summed over a,b),
∀a,b, $d_{ab} = \Sigma t_h d_{ab}^h, t_h \geq 0$ (summed over h=1 to H).

Following the approach of Applegate and Cohen, it can be shown by linear programming duality that max $\Sigma d_{ab} f_{ab}(L)/c(L) \leq r$ if and only if the following set of constraints can be satisfied:

∀links L,M: $\pi(L,M) \geq 0$;
∀link L, nodes (i,j): $p_L(i,j) \geq 0$, with $p_L(i,i)=0$;
∀link L: $\Sigma_m \pi(L,M) c(M) \leq r$
∀link L, O-D pair a→b: $f_{ab}(L)/c(L) \leq p_L(a,b) - \lambda_L(a,b)$
∀link L, node i, link M=(j,k): $p_L(i,k) \leq p_L(i,j) + \pi(L,M)$
=link L, h=1, …, H,: $\Sigma_{a,b} \lambda_L(a,b) d_{ab}^h \geq 0$ The last two lines of the linear programming (LP) formulation set forth above can then be replaced with the set of constraints above, to form a single LP model to solve for optimal min-max routing on the given convex hull D constructed from H traffic matrices D. This single LP model is shown in Table 1 below.

TABLE 1

LP model to solve for min-max routing on D.

min r,
   subject to
   f is a routing
   $\forall$links L,M : $\pi$ (L,M) $\geq$ 0;
   $\forall$link L, nodes (i,j) : $p_L(i,j) \geq 0$, with $p_L$ (i,i) = 0;
   $\forall$link L : $\Sigma_m \pi$ (L,M)c(M) $\leq$ r
   $\forall$link L, O-D pair a$\rightarrow$b : $f_{ab}(L)/c(L) \leq p_L(a,b) - \lambda_L(a,b)$
   $\forall$link L, node i, link M = (j,k) : $p_L$ (i,k) $\leq p_L$ (i,j) + $\pi$ (L,M)
   $\forall$link L, h = 1,.....,H, : $\Sigma_{a,b} \lambda_L(a,b) d_{ab}^h \geq 0$ The constraints of Table 1 may be selected and stored in step 406 in FIG. 4.

The single LP model of Table 1 is effective when future demands fall into the convex hull. Traffic fluctuation, however, may make future demands fall outside the convex hull, in which case performance may degrade significantly.

One possible way to handle this issue is to artificially expand the convex hull to include more points. More specifically, a convex hull is normally constructed using a convex combination of the extreme points (i.e., as discussed above, $\Sigma t_h D_h$, where $t_h$ is a coefficient between 0 and 1, $\Sigma_h t_h = 1$, and $D_h$ is the h-th traffic matrix TM.) We could expand the corresponding convex hull by letting $t_h$ take values less than 0 or greater than 1. Then routing could be optimized for all traffic demands that fall into the expanded convex hull. Such expansion could tolerate changes in traffic demands to a certain extent. There is, however, a significant trade-off between the degree of expansion and the performance optimality. In an extreme, the convex hull can be expanded to include all traffic demands, which results in oblivious routing. This is robust against arbitrary traffic changes, but does not provide the best performance for normal demands. Balancing such a trade-off is hard. Moreover this approach does not guarantee the worst-case performance unless the convex-hull includes all possible demands.

Optimization with Penalty Envelope Constraints

To address this issue, we have proposed, as discussed above, an optimization approach based on a penalty envelope PE. It guarantees worst-case performance under arbitrary traffic demands while achieving close-to-optimal performance under predictable demands. What we mean by a penalty envelope in the context of this example (optimizing by maximizing performance ratio) is this: A routing f is said to have penalty envelope $\bar{r}$ if the maximum performance ratio of f on the whole set of feasible traffic demands is no more than $\bar{r}$. By feasible traffic demands, we mean those that are predicted to be reasonably possible to occur. The penalty envelope constraint restricts the set of feasible routings to those f whose maximum performance ratio is less than or equal to $\bar{r}$. Therefore, in order to obtain an optimal routing f on D with penalty envelope $\bar{r}$, it suffices to restrict the search space of optimal TE to the set of routing with maximum performance ratio less than or equal to $\bar{r}$ on the set of all feasible traffic demands.

The restriction imposed by the penalty envelope requirement can be incorporated as a set of linear constraints which can be applied at step 408. A routing f has penalty envelope $\bar{r}$ if and only if the constraints set forth below in Table 2 are satisfied:

TABLE 2

LP constraints to impose penalty envelope $\bar{r}$.

$\forall$links L,M : $\bar{\pi}$ (L,M) $\geq$ 0;
$\forall$link L, nodes (i,j) : $\bar{p}_L(i,j) \geq 0$, with $\bar{p}_L$ (i,i) = 0;
$\forall$link L : $\Sigma_m \bar{\pi}$ (L,M)c(M) $\leq \bar{r}$
$\forall$link L, O-D pair a$\rightarrow$b : $f_{ab}(L)/c(L) \leq \bar{p}_L(a,b)$
$\forall$link L, node i, link M = (j,k) : $\bar{p}_L$ (i,k) $\leq \bar{p}_L$ (i,j) + $\bar{\pi}$ (L,M)

We can then add the penalty envelope constraints in Table 2 above to the LP formulation set out in Table 1. This is done in Table 3 below and gives us a new LP formulation that, when solved at step 410, optimizes min-max routing on a given convex hull D with required penalty envelope PE.

TABLE 3

LP formulation that optimizes min-max routing on a given convex hull D with required penalty envelope.

min r,
   subject to
   f is a routing
   $\forall$links L,M : $\pi$ (L,M) $\geq$ 0;
   $\forall$link L, nodes (i,j) : $p_L(i,j) \geq 0$, with $p_L$ (i,i) = 0;
   $\forall$link L : $\Sigma_m \pi$ (L,M)c(M) $\leq$ r
   $\forall$link L, O-D pair a$\rightarrow$b : $f_{ab}(L)/c(L) \leq p_L(a,b) - \lambda_L(a,b)$
   $\forall$link L, node i, link M = (j,k) : $p_L$ (i,k) $\leq p_L$ (i,j) + $\pi$ (L,M)
   $\forall$link L, h = 1,.....,H, : $\Sigma_{a,b} \lambda_L(a,b) d_{ab}^h \geq 0$
   $\forall$links L,M : $\bar{\pi}$ (L,M) $\geq$ 0;
   $\forall$link L, nodes (i,j) : $\bar{p}_L(i,j) \geq 0$, with $\bar{p}_L$ (i,i) = 0;
   $\forall$link L : $\Sigma_m \bar{\pi}$ (L,M)c(M) $\leq \bar{r}$
   $\forall$link L, O-D pair a$\rightarrow$b : $f_{ab}(L)/c(L) \leq \bar{p}_L(a,b)$
   $\forall$link L, node i, link M = (j,k) : $\bar{p}_L$ (i,k) $\leq \bar{p}_L$ (i,j) + $\bar{\pi}$ (L,M)

The LP formulation of FIG. 3 is provided to TE control system 30, which also includes computational hardware and software as shown in FIG. 2 for solving the optimization problem it defines, based on the measured and stored traffic demand matrices D, and a value for the penalty envelope $\bar{r}$, to produce the optimized routing f. To solve the LP formulations above, we used CPLEX® software, an optimization software product of ILOG, Inc. 1080 Linda Vista Ave., Mountain View, Calif. 94043 which runs on various UNIX and Windows platforms. By default, CPLEX uses dual simplex to solve linear programs, but this is a poor choice for the LP formulations set out in the tables above. Given the properties of the formulation, we used the barrier method without crossover, described for example in D. Bertsekas, *Nonlinear Programming*, Athena Scientific, 2d ed. 1999. Other linear programming solution approaches and techniques will occur to those of skill in the art.

Choosing a penalty envelope involves a trade-off. When the value of the penalty envelope is high, the penalty guarantee is weak; however, a higher value of envelope leaves more room for optimization. When the envelope is set to be a very large value, the LP formulation becomes prediction based routing. On the other hand, when the value of the envelope is low, the penalty guarantee is strong; but not much room is left for optimization. When the penalty envelope is equal to the oblivious ratio of the whole feasible traffic set, the scheme becomes oblivious routing.

Our evaluations of networks using oblivious routing and routing using the methods of the present invention have provided useful and at times surprising information on choices for selecting the value of the penalty envelope. For example, we found that penalty envelope to oblivious ratios of 2.50/2.045=1.22, 2.00/1.853=1.08 and 2.05/2.014=1.02 provided performances in networks that not only were reasonably close to optimum for normal traffic, but also able to handle unexpected traffic as well as or better than oblivious routing. Thus ratios of about 1.02 to 1.2 are effective. We studied the effect on network performance of changing the penalty envelope, and found that increasing the ratio above about 1.08 did not improve performance during normal operation very much. We found, however, that the lower ratios, such as about 1.02 to 1.08, provide a remarkable ability to both optimize for normal traffic as well as safeguard against unexpected demands.

The methods given above to optimize the performance ratio in a network can readily be applied to optimizing other network characteristics, such as cost, or MLU, or any generalized characteristic, as explained in the COPE paper.

Traffic Engineering with Dynamic Interdomain Routes

The method presented above for intradomain routing is robust against variations in traffic demands, but requires static topology. When the underlying network topology changes (e.g., a link fails and the computed routing uses the link), then the routing is no longer valid and has to be updated. If a failed link is an important intradomain link used by many origin-destination (O-D) pairs, a good strategy is to pre-compute routing for each failure scenario. Our method can be easily extended to deal with such scenarios. For the network egress links and interdomain routes, however, due to their special position at the periphery of the network, we can implement robust routing using the methods of the invention without undue precomputation.

Figure 7:
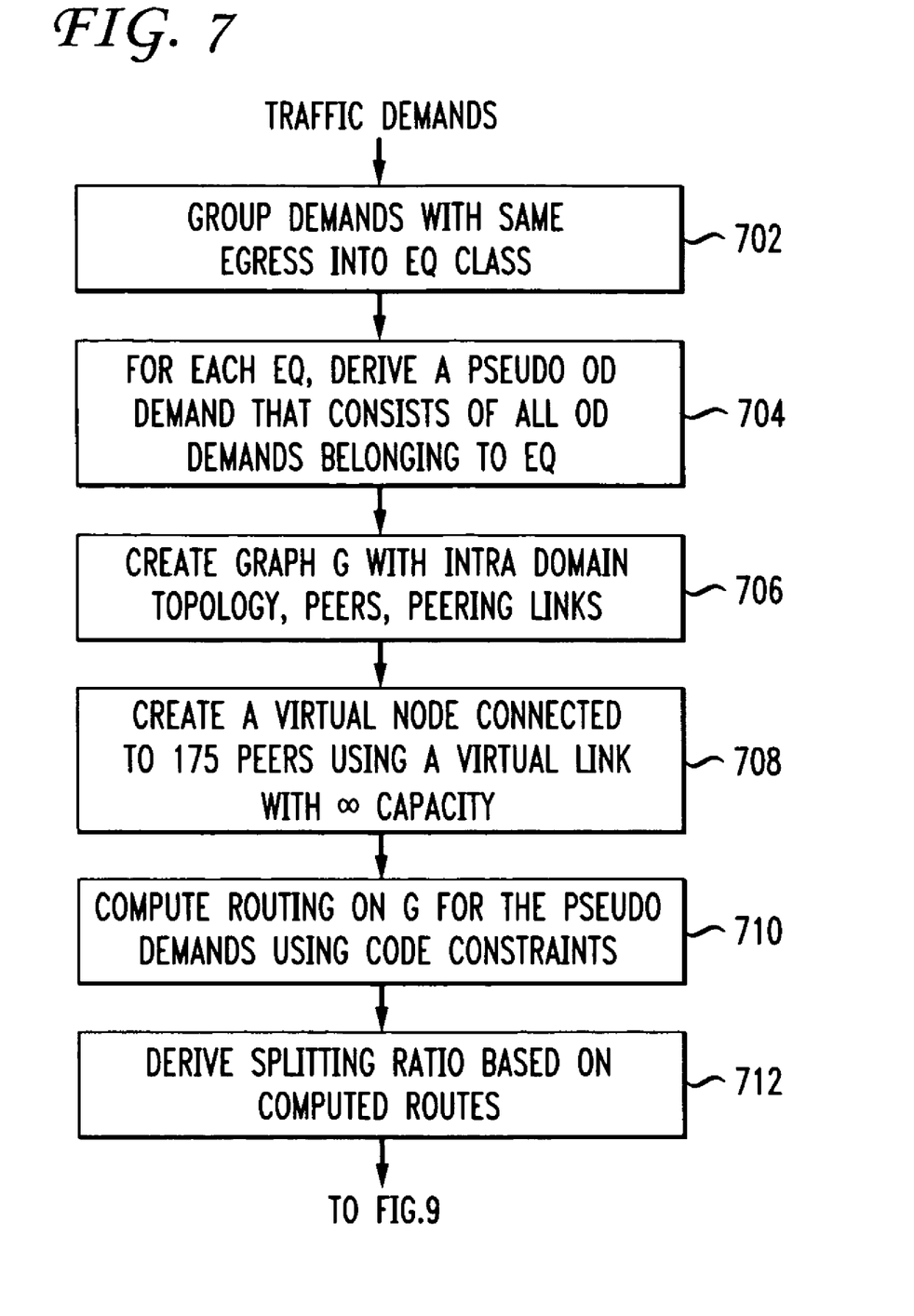
FIG. 7 is a flowchart illustrating a method for obtaining a splitting ratio for interdomain routing according to the invention.
Figure 8:
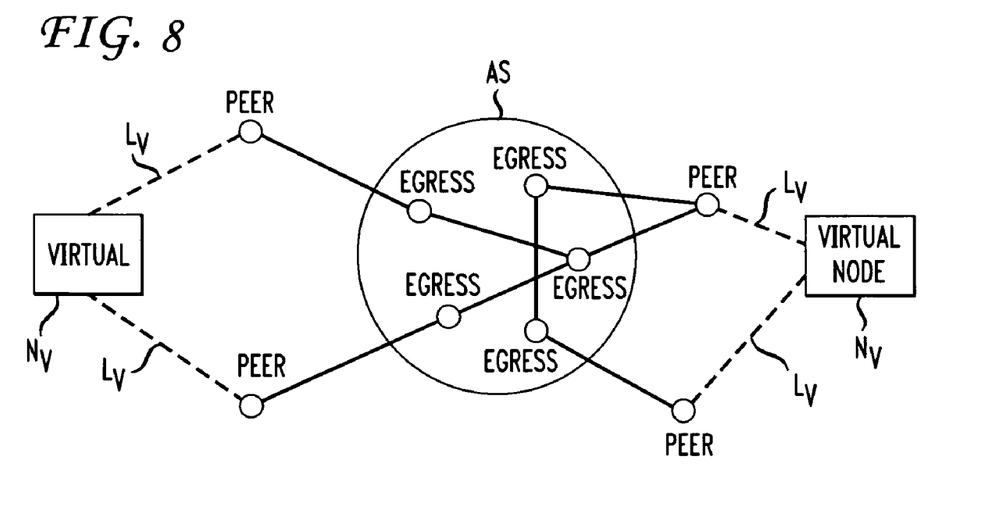
FIG. 8 is a graph illustrating a step in the method of FIG. 7.
Figure 9:
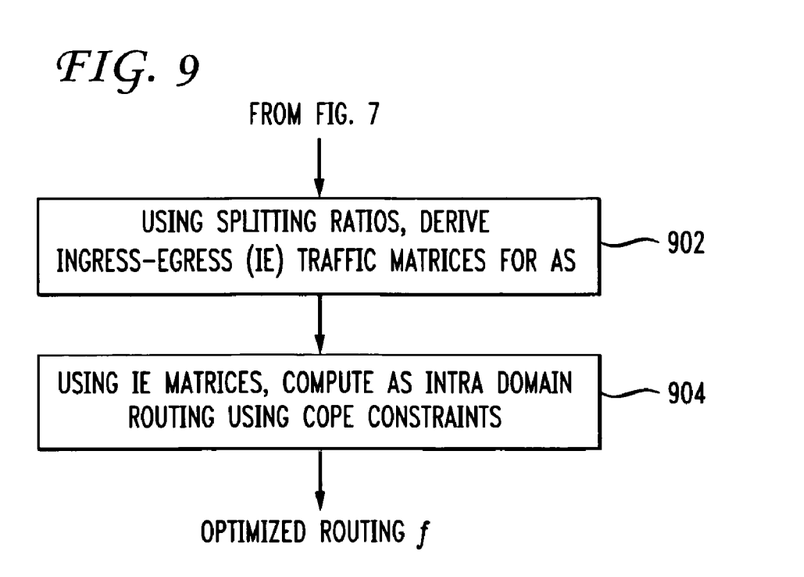
FIG. 9 is a flowchart illustrating a method for providing an interdomain routing using the splitting ratio of FIG. 7.

FIGS. 7-9 illustrate a method according to the invention to handle changes in both traffic demands and network topology. According to the method, we first apply COPE to compute robust splitting ratios across peering links for sending origin-destination (O-D) traffic demands. Then, based on the computed splitting ratios, we derive ingress-egress (IE) traffic matrices. Next, we use the IE matrices to compute a robust intradomain routing by applying COPE.

FIG. 7 shows the method for computing splitting ratios. First, in step 702, we group the destination prefixes that share the same set of egress points into an equivalence class EQ. In step 704, for each equivalence class EQ, we derive its pseudo O-D demand that consists of all the OD demands belonging to EQ. Then in step 706 we construct a graph G, an example of which is shown in FIG. 8, which includes the intradomain topology, peers, and peering links $L_p$. In step 708 we further create in graph G a virtual node $N_v$ to connect to its corresponding peers using a virtual link $L_v$ with infinite capacity $c_v$. In step 710 we apply the COPE method (combined TM optimization with penalty envelope), as illustrated for example in FIG. 4, to the resulting topology to compute the optimized routing and then in step 712 we derive the splitting ratios across peering links $L_p$ based on the computed routes.

Using the splitting ratios derived in step 712, FIG. 9 then shows how we proceed to obtain an optimized intradomain routing. In step 902, using the splitting ratios, we derive ingress-egress traffic matrices TM for the intradomain traffic. In step 904, these ingress-egress traffic matrices are used for computing intradomain routing using the COPE constraints, such as those provided in Table 3. Note that unlike in FIG. 7, here the inputs of COPE are the ingress-egress traffic matrices and the intradomain topology. This is important because we want to ensure that when peering links go up and down, the penalty envelop of the resulting routing is not affected.

While various embodiments of the present invention have been described above, it should be understood that they have been presented by way of example, and not limitation. It will be apparent to persons skilled in the relevant art that various changes in form and detail can be placed therein without departing from the spirit and scope of the invention. Thus the present invention should not be limited by any of the above-described example embodiments, but should be defined only in accordance with the following claims and their equivalents.

What is claimed is:

1. A method for routing communications traffic in an intra-domain network having routers at nodes and links carrying traffic between nodes comprising:
    monitoring traffic demands between origin and destination nodes for the intradomain network;
    constructing a set of predicted traffic demands for traffic on the network based on the monitored traffic demands;
    selecting a network characteristic to optimize:
    computing an optimized routing matrix for the intradomain network by
        setting linear programming constraints to provide a routing for the set of predicted traffic demands which will optimize the selected network characteristic,
        setting linear programming constraints to provide a penalty envelope to limit the maximum value of the selected network characteristic for the routing, the penalty envelope maximum value being above the oblivious routing value, and
        solving linear programs with such linear programming constraints to produce an optimized routing subject to the penalty envelope; and
    adjusting routing in the intradomain network to correspond to the optimized routing;
    whereby, by basing the optimized routing both on the predicted traffic demands and on the penalty envelope, efficient network resource utilization is obtained for expected traffic demands while providing a worst-case performance guarantee for unexpected traffic demands.

2. A method for routing communications traffic as claimed in claim 1 wherein the step of constructing a set of predicted traffic demands comprises collecting sets of monitored traffic demands measured during selected historical time periods, and constructing the set of predicted traffic demands from such historical traffic demands.

3. A method for routing communications traffic as claimed in claim 2 wherein the set of predicted traffic demands is constructed as a convex hull of the monitored demands.

4. A method for routing communications traffic as claimed in claim 3 wherein the convex hull is expressed as a convex cone.

5. A method for routing communications traffic as claimed in claim 1 wherein the step of computing an optimized routing for the intradomain network optimizes for the minimum ratio of network utilization to optimal network utilization (performance ratio) of the network.

6. A method for routing communications traffic as claimed in claim 1 wherein the step of computing an optimized routing for the intradomain network optimizes for the minimum maximum link utilization (MLU) of the network.

7. A method for routing communications traffic as claimed in claim 1 wherein the step of computing an optimized routing for the intradomain network optimizes for the minimum cost of the network.

8. A method for routing communications traffic as claimed in claim 1 wherein the penalty envelope value is selected to be above the oblivious ratio value by an amount between 2% and 20%.

9. A method for routing communications traffic as claimed in claim 8 wherein the amount is between 2% and 8%.

10. A method for routing communications traffic as claimed in claim 1 wherein the linear programming constraints to optimize for a selected network characteristic solve for a routing matrix f which achieves a minimum r under constraints of the form:

$$\begin{aligned}
&\min r, \\
&\text{subject to} \\
&f \text{ is a routing} \\
&\forall \text{links } L,M : \pi(L,M) \geq 0; \\
&\forall \text{link } L, \text{ nodes } (i,j) : p_L(i,j) \geq 0, \text{ with } p_L(i,i) = 0; \\
&\forall \text{link } L : \Sigma_m \pi(L,M)c(M) \leq r \\
&\forall \text{link } L, \text{ O-D pair } a \rightarrow b : f_{ab}(L)/c(L) \leq p_L(a,b) - \lambda_L(a,b) \\
&\forall \text{link } L, \text{ node } i, \text{ link } M = (j,k) : p_L(i,k) \leq p_L(i,j) + \pi(L,M) \\
&\forall \text{link } L, h = 1,\ldots,H, : \Sigma_{a,b} \lambda_L(a,b) d_{ab}^h \geq 0
\end{aligned}$$

where
L,M are links between nodes
i,j are nodes
c=link capacity
O-D denotes origin and destination nodes
h=number of the collected set of monitored traffic demands (1 to H).

11. A method for routing communications traffic as claimed in claim 1 wherein the linear programming constraints to optimize for a selected network characteristic have variables to solve for a routing matrix f with a minimum r under constraints for the penalty envelope $\bar{r}$ of the form:

$$\begin{aligned}
&\forall \text{links } L,M : \bar{\pi}(L,M) \geq 0; \\
&\forall \text{link } L, \text{ nodes } (i,j) : \bar{p}_L(i,j) \geq 0, \text{ with } \bar{p}_L(i,i) = 0; \\
&\forall \text{link } L : \Sigma_m \bar{\pi}(L,M)c(M) \leq \bar{r} \\
&\forall \text{link } L, \text{ O-D pair } a \rightarrow b : f_{ab}(L)/c(L) \leq \bar{p}_L(a,b) \\
&\forall \text{link } L, \text{ node } i, \text{ link } M = (j,k) : \bar{p}_L(i,k) \leq \bar{p}_L(i,j) + \bar{\pi}(L,M)
\end{aligned}$$

12. A method for routing communications traffic as claimed in claim 1 wherein the linear programming constraints to optimize for a selected network characteristic have variables to solve for a routing matrix f with a minimum r and wherein the constraints for the optimization and the penalty envelope $\bar{r}$ are of the form:

$$\begin{aligned}
&\min r, \\
&\text{subject to} \\
&f \text{ is a routing} \\
&\forall \text{links } L,M : \pi(L,M) \geq 0; \\
&\forall \text{link } L, \text{ nodes } (i,j) : p_L(i,j) \geq 0, \text{ with } p_L(i,i) = 0; \\
&\forall \text{link } L : \Sigma_m \pi(L,M)c(M) \leq r \\
&\forall \text{link } L, \text{ O-D pair } a \rightarrow b : f_{ab}(L)/c(L) \leq p_L(a,b) - \lambda_L(a,b) \\
&\forall \text{link } L, \text{ node } i, \text{ link } M = (j,k) : p_L(i,k) \leq p_L(i,j) + \pi(L,M) \\
&\forall \text{link } L, h = 1,\ldots,H, : \Sigma_{a,b} \lambda_L(a,b) d_{ab}^h \geq 0 \\
&\forall \text{links } L,M : \bar{\pi}(L,M) \geq 0; \\
&\forall \text{link } L, \text{ nodes } (i,j) : \bar{p}_L(i,j) \geq 0, \text{ with } \bar{p}_L(i,i) = 0; \\
&\forall \text{link } L : \Sigma_m \bar{\pi}(L,M)c(M) \leq \bar{r} \\
&\forall \text{link } L, \text{ O-D pair } a \rightarrow b : f_{ab}(L)/c(L) \leq \bar{p}_L(a,b) \\
&\forall \text{link } L, \text{ node } i, \text{ link } M = (j,k) : \bar{p}_L(i,k) \leq \bar{p}_L(i,j) + \bar{\pi}(L,M)
\end{aligned}$$

where
L,M are links between nodes
i,j are nodes
c=link capacity
O-D denotes origin and destination nodes
h=number of the collected set of traffic demands (1 to H).

13. A system for routing communications traffic in an intradomain network having routers at nodes and links carrying traffic between nodes comprising:
a network traffic monitoring system for measuring traffic demands on the network during selected time periods;
a network traffic management configuration system for applying routing control information to the network to control the flow of traffic on the network links; and
a traffic engineering control system for receiving the measured traffic demands from the monitoring system and for computing a set of routing control parameters to be forwarded to the management configuration system, the traffic engineering control system
constructing a set of predicted traffic demands for traffic on the network based on the monitored traffic demands and computing an optimized routing matrix for the intradomain network by
setting linear programming constraints to provide a routing for the set of predicted traffic demands which will optimize a selected network characteristic,
setting linear programming constraints to provide a penalty envelope to limit the maximum value of the selected network characteristic for the routing, the penalty envelope maximum value being above the oblivious routing value, and
solving linear programs with such linear programming constraints to produce an optimized routing subject to the penalty envelope;
whereby, by basing the routing both on the predicted traffic demand and on the penalty envelope, efficient network resource utilization is obtained for expected traffic demands while providing a worst-case performance guarantee for unexpected traffic demands.

14. The system for routing communications traffic as claimed in claim 13 wherein the traffic engineering control system constructs a set of predicted traffic demands by collecting sets of monitored traffic demands measured during selected historical time periods, and constructing the set of predicted traffic demands from such historical traffic demands.

15. The system for routing communications traffic as claimed in claim 14 wherein the set of predicted traffic demands is constructed as a convex hull of the monitored demands.

16. The system for routing communications traffic as claimed in claim 15 wherein the convex hull is expressed as a convex cone.

17. The system for routing communications traffic as claimed in claim 13 wherein the traffic engineering control system obtains an optimized routing for the intradomain network by optimizing for the minimum ratio of network utilization to optimal network utilization (performance ratio) of the network.

18. The system for routing communications traffic as claimed in claim 13 wherein the traffic engineering control system obtains an optimized routing for the intradomain network by optimizing for the minimum maximum link utilization (MLU) of the network.

19. The system for routing communications traffic as claimed in claim 13 wherein the traffic engineering control system obtains an optimized routing for the intradomain network by optimizing for the minimum cost of the network.

20. The system for routing communications traffic as claimed in claim 13 wherein the penalty envelope value is selected to be above the oblivious ratio value by an amount between 2% and 20%.

21. The system for routing communications traffic as claimed in claim 20 wherein the amount is between 2% and 8%.

22. The system for routing communications traffic as claimed in claim 13 wherein the linear programming constraints to optimize for a selected network characteristic have variables to solve for a routing matrix f with a minimum r under constraints of the form:

$$\begin{aligned}
&\min r, \\
&\text{subject to} \\
&f \text{ is a routing} \\
&\forall \text{links } L,M : \pi(L,M) \geq 0; \\
&\forall \text{link } L, \text{ nodes } (i,j) : p_L(i,j) \geq 0, \text{ with } p_L(i,i) = 0; \\
&\forall \text{link } L : \Sigma_m \pi(L,M)c(M) \leq r \\
&\forall \text{link } L, \text{ O-D pair } a \rightarrow b : f_{ab}(L)/c(L) \leq p_L(a,b) - \lambda_L(a,b) \\
&\forall \text{link } L, \text{ node } i, \text{ link } M = (j,k) : p_L(i,k) \leq p_L(i,j) + \pi(L,M) \\
&\forall \text{link } L, h = 1,\ldots,H, : \Sigma_{a,b} \lambda_L(a,b) d_{ab}^h \geq 0
\end{aligned}$$

where
L,M are links between nodes
i,j are nodes
c=link capacity
O-D denotes origin and destination nodes
h=number of the collected set of monitored traffic demands (1 to H).

23. The system for routing communications traffic as claimed in claim 13 wherein the linear programming constraints to optimize for a selected network characteristic have variables to solve for a routing matrix f with a minimum r under constraints for the penalty envelope $\bar{r}$ of the form:

$$\begin{aligned}
&\forall \text{links } L,M : \bar{\pi}(L,M) \geq 0; \\
&\forall \text{link } L, \text{ nodes } (i,j) : \bar{p}_L(i,j) \geq 0, \text{ with } \bar{p}_L(i,i) = 0; \\
&\forall \text{link } L : \Sigma_m \bar{\pi}(L,M)c(M) \leq \bar{r} \\
&\forall \text{link } L, \text{ O-D pair } a \rightarrow b : f_{ab}(L)/c(L) \leq \bar{p}_L(a,b) \\
&\forall \text{link } L, \text{ node } i, \text{ link } M = (j,k) : \bar{p}_L(i,k) \leq \bar{p}_L(i,j) + \bar{\pi}(L,M)
\end{aligned}$$

24. The system for routing communications traffic as claimed in claim 13 wherein the linear programming constraints to optimize for a selected network characteristic have variables to solve for a routing matrix f with a minimum r and wherein the constraints for the optimization and the penalty envelope $\bar{r}$ are of the form:

$$\begin{aligned}
&\min r, \\
&\text{subject to} \\
&f \text{ is a routing} \\
&\forall \text{links } L,M : \pi(L,M) \geq 0; \\
&\forall \text{link } L, \text{ nodes } (i,j) : p_L(i,j) \geq 0, \text{ with } p_L(i,i) = 0; \\
&\forall \text{link } L : \Sigma_m \pi(L,M)c(M) \leq r \\
&\forall \text{link } L, \text{ O-D pair } a \rightarrow b : f_{ab}(L)/c(L) \leq p_L(a,b) - \lambda_L(a,b) \\
&\forall \text{link } L, \text{ node } i, \text{ link } M = (j,k) : p_L(i,k) \leq p_L(i,j) + \pi(L,M) \\
&\forall \text{link } L, h = 1,\ldots,H, : \Sigma_{a,b} \lambda_L(a,b) d_{ab}^h \geq 0 \\
&\forall \text{links } L,M : \bar{\pi}(L,M) \geq 0; \\
&\forall \text{link } L, \text{ nodes } (i,j) : \bar{p}_L(i,j) \geq 0, \text{ with } \bar{p}_L(i,i) = 0; \\
&\forall \text{link } L : \Sigma_m \bar{\pi}(L,M)c(M) \leq \bar{r} \\
&\forall \text{link } L, \text{ O-D pair } a \rightarrow b : f_{ab}(L)/c(L) \leq \bar{p}_L(a,b) \\
&\forall \text{link } L, \text{ node } i, \text{ link } M = (j,k) : \bar{p}_L(i,k) \leq \bar{p}_L(i,j) + \bar{\pi}(L,M)
\end{aligned}$$

where
L,M are links between nodes
i,j are nodes
c=link capacity
O-D denotes origin and destination nodes
h=number of the collected set of traffic demands (1 to H).

25. A computer program product executed by a computer processor to establish routing for communications traffic in an intradomain network having routers at nodes and links carrying traffic between nodes, the computer program product comprising a storage medium for program code, said program code comprising:

program code executed by a computer to collect a plurality of sets of traffic demands between origin and destination nodes for the intradomain network;

program code executed by a computer to construct a set of predicted traffic demands for traffic on the network based on the collected sets of traffic demands;

program code executed by a computer to compute an optimized routing matrix for the intradomain network by setting linear programming constraints to provide a routing for the set of predicted traffic demands which will optimize a selected network characteristic, setting linear programming constraints to provide a penalty envelope to limit the maximum value of the selected network characteristic for the routing, the penalty envelope maximum value being above the oblivious routing value, and solving the linear programs with such linear programming constraints to produce an optimized routing subject to the penalty envelope;

whereby, by basing the routing both on the predicted traffic demand and on the penalty envelope, application of the optimized routing to the intradomain network permits efficient resource utilization to be obtained for expected traffic demands while providing a worst-case guarantee for unexpected traffic demands.

26. The computer program product of claim 25 wherein the collected sets of traffic demands are historical traffic demands measured during selected historical time periods, and the set of predicted traffic demands is constructed from such historical traffic demands.

27. The computer program product of claim 26 wherein the set of predicted traffic demands is constructed as a convex hull of the historical traffic demands.

28. The computer program product of claim 27 wherein the convex hull is expressed as a convex cone.

29. The computer program product of claim 25 wherein the program code executed by a computer computes an optimized routing for the intradomain network that optimizes for the minimum ratio of network utilization to optimal network utilization (performance ratio) of the network.

30. The computer program product of claim 25 wherein the program code executed by a computer computes an optimized routing for the intradomain network that optimizes for the minimum maximum link utilization (MLU) of the network.

31. The computer program product of claim 25 wherein the program code executed by a computer computes an optimized routing for the intradomain network that optimizes for the minimum cost of the network.

32. The computer program product of claim 25 wherein the penalty envelope value is selected to be above the oblivious value by an amount between 2% and 20%.

33. The computer program product of claim 32 wherein the amount is between 2% and 8%.

34. The computer program product of claim 25 wherein the linear programming constraints to optimize for a selected network characteristic have variables to solve for a routing matrix f with a minimum r under constraints of the form:

$$\begin{aligned}
&\min r, \\
&\text{subject to} \\
&\quad f \text{ is a routing} \\
&\quad \forall \text{links } L,M : \pi(L,M) \geq 0; \\
&\quad \forall \text{link } L, \text{ nodes } (i,j) : p_L(i,j) \geq 0, \text{ with } p_L(i,i) = 0; \\
&\quad \forall \text{link } L : \Sigma_m \pi(L,M)c(M) \leq r \\
&\quad \forall \text{link } L, \text{ O-D pair } a \to b : f_{ab}(L)/c(L) \leq p_L(a,b) - \lambda_L(a,b) \\
&\quad \forall \text{link } L, \text{ node } i, \text{ link } M = (j,k) : p_L(i,k) \leq p_L(i,j) + \pi(L,M) \\
&\quad \forall \text{link } L, h = 1,\ldots,H, \Sigma_{a,b} \lambda_L(a,b) d_{ab}^h \geq 0
\end{aligned}$$

where

L,M are links between nodes i,j are nodes c=link capacity

O-D denotes origin and destination nodes h=number of the collected set of traffic demands (1 to H).

35. The computer program product of claim 25 wherein the linear programming constraints to optimize for a selected network characteristic have variables to solve for a routing matrix f with a minimum r under constraints for the penalty envelope $\bar{r}$ of the form:

$$\begin{aligned}
&\forall \text{links } L,M : \bar{\pi}(L,M) \geq 0; \\
&\forall \text{link } L, \text{ nodes } (i,j) : \bar{p}_L(i,j) \geq 0, \text{ with } \bar{p}_L(i,i) = 0; \\
&\forall \text{link } L : \Sigma_m \bar{\pi}(L,M)c(M) \leq \bar{r} \\
&\forall \text{link } L, \text{ O-D pair } a \to b : f_{ab}(L)/c(L) \leq \bar{p}_L(a,b) \\
&\forall \text{link } L, \text{ node } i, \text{ link } M = (j,k) : \bar{p}_L(i,k) \leq \bar{p}_L(i,j) + \bar{\pi}(L,M)
\end{aligned}$$

36. The computer program product of claim 25 wherein the linear programming constraints to optimize for a selected network characteristic have variables to solve for a routing matrix f with a minimum r and wherein the constraints for the optimization and the penalty envelope $\bar{r}$ are of the form:

$$\begin{aligned}
&\min r, \\
&\text{subject to} \\
&\quad f \text{ is a routing} \\
&\quad \forall \text{links } L,M : \pi(L,M) \geq 0; \\
&\quad \forall \text{link } L, \text{ nodes } (i,j) : p_L(i,j) \geq 0, \text{ with } p_L(i,i) = 0; \\
&\quad \forall \text{link } L : \Sigma_m \pi(L,M)c(M) \leq r \\
&\quad \forall \text{link } L, \text{ O-D pair } a \to b : f_{ab}(L)/c(L) \leq p_L(a,b) - \lambda_L(a,b) \\
&\quad \forall \text{link } L, \text{ node } i, \text{ link } M = (j,k) : p_L(i,k) \leq p_L(i,j) + \pi(L,M) \\
&\quad \forall \text{link } L, h = 1,\ldots,H, \Sigma_{a,b} \lambda_L(a,b) d_{ab}^h \geq 0 \\
&\quad \forall \text{links } L,M : \bar{\pi}(L,M) \geq 0; \\
&\quad \forall \text{link } L, \text{ nodes } (i,j) : \bar{p}_L(i,j) \geq 0, \text{ with } \bar{p}_L(i,i) = 0; \\
&\quad \forall \text{link } L : \Sigma_m \bar{\pi}(L,M)c(M) \leq \bar{r} \\
&\quad \forall \text{link } L, \text{ O-D pair } a \to b : f_{ab}(L)/c(L) \leq \bar{p}_L(a,b) \\
&\quad \forall \text{link } L, \text{ node } i, \text{ link } M = (j,k) : \bar{p}_L(i,k) \leq \bar{p}_L(i,j) + \bar{\pi}(L,M)
\end{aligned}$$

where

L,M are links between nodes i,j are nodes c=link capacity

O-D denotes origin and destination nodes h=number of the collected set of traffic demands (1 to H).

37. A method for selecting routing in an intradomain network having routers at nodes and links carrying traffic between nodes and having ingress and egress links connected through peering links to at least one other network, comprising:

measuring origin-destination pair traffic demands in the intradomain network;

computing splitting ratios across peering links for sending origin-destination pair traffic demands in the interdomain network to the at least one other network;

using the computed splitting ratios to apportion traffic from ingress and egress links connected through peering links, deriving ingress-egress (IE) traffic demand matrices for the intradomain network that reflect such apportioned traffic;

computing an optimized routing matrix for the intradomain network by selecting a network characteristic to optimize, setting linear programming constraints to optimize the selected network characteristic over the derived IE traffic matrices and to provide a penalty envelope to limit the maximum value of the selected network characteristic for the routing, the penalty envelope maximum value being above the oblivious routing value, and solving linear programs with such linear programming constraints to produce the optimized routing subject to the penalty envelope; and adjusting routing in the intradomain network to correspond to the optimized routing;

whereby, by basing the routing both on the predicted traffic demand and on the penalty envelope, efficient network resource utilization is obtained for expected traffic demands while providing a worst-case performance guarantee for unexpected traffic demands.

38. A method as claimed in claim 37 wherein the splitting ratios are computed by grouping demands with the same egress links into an equivalence class;

for each equivalence class, deriving a pseudo origin-destination demand that comprises all of the origin-destination demands belonging to the equivalence class;

creating a network graph with the intradomain node and link topology, peers and peering links, and for each peer creating a virtual node connected to the peering links with a virtual link of infinite capacity;

computing an optimized routing matrix for the network graph so constructed based both on the pseudo origin-destination demand matrices and on a penalty envelope by setting linear programming constraints to optimize a selected network characteristic and to provide a penalty envelope to limit the maximum of the selected network characteristic for the routing, the penalty envelope maximum value being above the oblivious routing value, and solving linear programs with such linear programming constraints to produce the optimized routing subject to the penalty envelope; and deriving splitting ratios for the peering links on the basis of the computed optimized routing.

* * * * *